(12) United States Patent
McMillan (10) Patent No.: US 9,801,245 B2
(45) Date of Patent: Oct. 24, 2017

(54) LIGHT FIXTURE (71) Applicant: George Erik McMillan, Hickory, NC (US)

(72) Inventor: George Erik McMillan, Hickory, NC (US)

(*) Notice: Subject to any disclaimer, the term of this patent is extended or adjusted under 35 U.S.C. 154(b) by 0 days.

(21) Appl. No.: 15/213,779

(22) Filed: Jul. 19, 2016

(65) Prior Publication Data

US 2017/0013691 A1    Jan. 12, 2017

Related U.S. Application Data (63) Continuation of application No. 14/444,997, filed on Jul. 28, 2014, now abandoned.

(60) Provisional application No. 61/951,480, filed on Mar. 11, 2014, provisional application No. 61/859,031, filed on Jul. 26, 2013.

(51) Int. Cl.
| | |
|---|---|
| H05B 37/02 | (2006.01) |
| H05B 33/08 | (2006.01) |
| F21S 8/02 | (2006.01) |
| F21S 8/08 | (2006.01) |
| F21V 3/00 | (2015.01) |
| F21V 23/04 | (2006.01) |
| F21Y 115/10 | (2016.01) |

(52) U.S. Cl.
CPC .......... *H05B 33/0845* (2013.01); *F21S 8/026* (2013.01); *F21S 8/086* (2013.01); *F21V 3/00* (2013.01); *F21V 23/04* (2013.01); H05B 33/0809 (2013.01); *H05B 37/0218* (2013.01); *H05B 37/0272* (2013.01); F21Y 2115/10 (2016.08)

(58) Field of Classification Search
CPC ............ H05B 33/0815; H05B 33/0809; H05B 33/0845; H05B 37/0218; H05B 37/0272
USPC ....... 315/246, 247, 287, 291, 294, 297, 307, 315/312
See application file for complete search history.

(56) References Cited

U.S. PATENT DOCUMENTS

| | | | |
|---|---|---|---|
| 4,933,603 A | 6/1990 | Bier | |
| 5,744,913 A * | 4/1998 | Martich | F21V 23/00 250/205 |
| 2008/0224633 A1* | 9/2008 | Melanson | H05B 33/0809 315/292 |
| 2009/0278479 A1 | 11/2009 | Platner et al. | |
| 2010/0066260 A1 | 3/2010 | Newman, Jr. et al. | |
| 2011/0148318 A1* | 6/2011 | Shackle | H05B 33/0815 315/291 |
| 2012/0223658 A1* | 9/2012 | Otzen | F21V 23/04 315/307 |
| 2013/0163243 A1* | 6/2013 | Reed | H05B 33/0803 362/235 |
| 2015/0028776 A1 | 1/2015 | McMillan | |

* cited by examiner

*Primary Examiner* — Tung X Le
(74) *Attorney, Agent, or Firm* — Murphy, Bilak & Homiller, PLLC (57) ABSTRACT

An apparatus that is configured to be installed with a predetermined maximum wattage output wherein the maximum wattage output can be selected by the installer. The light fixture includes a housing and an adjustable resistor. A light source is electrically to the adjustable resistor. And the adjustable resistor is associated with the housing.

20 Claims, 5 Drawing Sheets

LIGHT FIXTURE

TECHNICAL FIELD

These descriptions relate generally toward energy efficiency lighting systems targeted at minimizing energy consumption and maximizing/tailoring lumen output. These descriptions are also directed toward light emitting diode (LED) light fixtures that are capable of a wide adjustment range of wattage and lumen outputs, and therefore are capable of being adapted to any indoor or outdoor lighting need.

BACKGROUND

In the lighting industry, the goal of energy efficiency precipitates a turning away from energy demanding incandescent lighting to more efficient light systems, like High Intensity Discharge (HID/HPS, MV, MH) and fluorescent (CFL, T12, T8, T5, etc.) lights, and even more energy frugal systems such as Light Emitting Diodes (LED). These light systems are difficult or, in some cases, impossible to dim with standard line dimmable systems. New dimming systems have been created to dim specialized ballast or driver powered light systems such as fluorescent and LED light fixtures. These new systems include Pulse Width Modulation (PWM), 0-1 OV and secondary resistive type controls. Instead of dimming by lowering the voltage going to the light fixture, as with common line dimming, these new dimming systems utilize a dedicated set of control wires which regulate the Ballast or Driver Output.

A new industry has originated to help commercial entities to improve their energy efficiency: Energy Services Companies (ESCo's). ESCo's are hired to actively seek the most effective way for a client to save energy and, to become more eco-friendly in every aspect possible. A major area in which energy savings can be maximized is in lighting.

ESCo's integrate high efficiency lighting into commercial campus "retrofits", generating savings of 25-85%. But achieving these efficiency levels comes at a cost. ESCo's often encounter multitudes of light fixtures types and, each of these fixtures has varying wattage levels and light outputs.

ESCo's cannot purchase lighting in advance, because the ESCo's never know what lights systems (variety, size, wattage, lumen output, etc.) will be present, until after accessing the potential client's facility and after a detailed inventory list of the lights at the facility.

An example of an inventory list might indicate that an ESCo may need to order 50 LED recessed drop ceiling fixtures of 20 watts, and 35 fixtures at 30 watts, and 100 recessed drop ceiling fixtures that are 35 watts, and then every building in a 50 building campus may have equally random sets of lights. Creating an inventory list represents a very time consuming proposition and, if the count is incorrect or incomplete, entirely new problems arise. An ESCo's profit margin is inextricably tied to: 1) how well they replace the light to meet the lumen output; and 2) how many watts of energy are "saved" over the next 5 to 15 years.

Dimmers can lower a fixture's power consumption but it is not the answer for saving money. Even if a 40 W fixture is dimmed to 30 w to save on energy, if the dimmer is raised to max, the light will consume 40 w causing a serious monetary loss to the ESCo's profit margin. Lights "undimmed" over a period of years can require an additional 25% longer for their return on investment in the energy efficient retrofits.

All these issues prevent ESCo's from pre-ordering any light fixtures which, in turn, causes even more problems. The time-frame for installing said fixtures is affected greatly because it takes time to inventory and find the proper fixtures, and then there are further delays with ordering and shipping. If an ESCo company makes a mistake by ordering a number of fixtures that do not meet the light level expected by their client, these mistakes impact the ESCo's profit margin because the ESCo must remove and replace said lights with new fixtures so as to satisfy the customer's demands at the ESCo's expense.

What these ESCo's and other customers need is: a single product, for a given fixture type, that has the capability of replacing a multitude of existing lights; one fixture that can be limited at the high end for maximum wattage consumption (ensuring ESCo's meet their energy savings projections), while allowing for additional dimming by the end user. These lights would enable universality and nearly limitless "campus wide" energy efficiency and brightness tweaks and adjustments, and without the need to replace underperforming lights.

Today, indoor and outdoor light emitting diode (LED) light fixtures come in factory set wattage and lumen ranges. For example, standard roadway lights come in a variety of wattages, ranging from 150 watt ("W") to 250 W to 400 W. Purchasers often order a large quantity of wattage-specific lights, and, upon delivery, find the lumen output of the light does not "fit" the needs of the lighting location. The light could be too bright, or not bright enough. Pole height, terrain, reflectivity of the surfaces around the light, light overlap, and any number of other environmental factors can mean that the industry-standard, non-adjustable LED roadway light does not meet the lighting needs of the purchaser's location. In this situation, a purchaser either has to live with the inefficiency or inadequacy of the light, or try to return the light, which may cause the purchaser to loose time and money.

While there are computer controlled wattage output systems on the market, even those systems are constrained by working with a specific wattage output (e.g. 150 W, 250 W, and 400 W). Also, computer controlled wattage output systems add extra expense in installation and/or maintenance costs. Other systems provide for replacement of lighting drivers, LED arrays, or entire LED light engines, which can create added expense in installation labor and maintenance costs. The problem is compounded in that every installation environment, especially in outdoor applications, is inherently unique and could require multiple adjustments to find a LED light fixture that "fits" the environment.

Furthermore, the same disadvantages of the current wattage output systems are present in LED light fixtures used in a variety of other applications, such as exterior, interior, and agricultural settings. Thus, there exists a need for an adjustable LED lighting fixture that is capable of achieving a wide range of wattage and lumen output with a single lighting driver.

SUMMARY

This Summary is provided to introduce in a simplified form concepts that are further described in the following detailed descriptions. This Summary is not intended to identify key features or essential features of the claimed subject matter, nor is it to be construed as limiting the scope of the claimed subject matter.

According to the present invention there is provided a light fixture that is configured to be installed with a predetermined maximum wattage output wherein the maximum wattage output can be selected by the installer. The light fixture includes a housing and an adjustable resistor. A light source is electrically to the adjustable resistor. And the adjustable resistor is associated with the housing.

According to the present invention, there is provided a method for installing a light fixture that includes an adjustable resistor at a predetermined maximum wattage output. The method includes the steps of: determining a maximum wattage output; adjusting an adjustable resistor to the maximum wattage output for the given light fixture, wherein the adjustable resistor is in series connection with a driver of a light; and positioning the light fixture such that the adjustable resistor cannot be accessed.

According to one or more embodiments, a circuit is provided. The circuit includes a dimming controller, an adjustable resistor connected downstream of and in series connection with the dimming controller, a driver connected downstream and in series with the adjustable resistor, and a light connected downstream and in series with the driver.

According to one or more embodiments, the adjustable resistor is a slide resistor.

According to one or more embodiments, the adjustable resistor is a linear potentiometer.

According to one or more embodiments, the dimming controller is a 0-1 OV dimmer.

According to one or more embodiments, the dimming controller is a PWM.

According to one or more embodiments, the light is an LED.

According to one or more embodiments, the light is a fluorescent light.

According to one or more embodiments, the light is an incandescent light.

According to one or more embodiments, the light is an HID.

According to one or more embodiments, the dimming controller is selectively adjustable.

According to one or more embodiments, the adjustable resistor is selectively adjustable.

According to one or more embodiments, a method is provided. The method includes adjusting an adjustable resistor to a desired wattage output, wherein the adjustable resistor is in series connection with a driver of a light and adjusting a dimming control to a desired luminosity output, wherein the dimming control is in series connection with the adjustable resistor.

According to one or more embodiments, a method is provided. The method includes determining a maximum wattage output for a given light fixture and adjusting an adjustable resistor to the maximum wattage output for the given light fixture. The adjustable resistor is in series connection with a driver of a light and the light fixture is further adjustable by adjusting a dimming control to a desired luminosity output. The dimming control is in series connection with the adjustable resistor.

According to one or more embodiments, the LED light fixture includes a housing, at least one array of LED's (also interchangeably referred to herein as a LED array or LED light array), and at least one adjustable LED driver or other current controlling devices capable of controlling the wattage and lumen output of a least one array of LED's.

According to at least one embodiment, an LED light fixture includes a trimpot capable of adjusting said LED driver's output signals that control the wattage and lumen output of an LED array.

According to at least one embodiment, a trimpot is adjustable by an installer, purchaser, owner, or other by physically adjusting a knob, a slidable controller, or other physical means of a trimpot adjuster, or by electromagnetic control signal (e.g., RF, WiFi, or other electromagnetic control devices).

According to at least one embodiment, a LED light fixture can be optionally used in a variety of applications, including indoor and outdoor public, private, agricultural, or industrial lighting.

According to at least one embodiment, an LED light fixture is adapted for use in illuminating a street.

According to at least one embodiment, an LED light fixture is adapted for use in illuminating a parking lot.

According to at least one embodiment, an LED light fixture is adapted for use in illuminating a parking garage.

According to at least one embodiment, an LED light fixture is adapted for use in illuminating a commercial building exterior.

According to at least one embodiment, and LED light fixture is adapted for use in illuminating a residential building (i.e., home or apartment) exterior.

According to at least one embodiment, an LED light fixture is adapted for use in illuminating a commercial building interior.

According to at least one embodiment, an LED light fixture is adapted for use in illuminating a residential building interior.

According to at least one embodiment, an LED light fixture is adapted for use in illuminating an agricultural or horticultural space.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The one or more embodiments disclosed herein provide for an LED light fixture of any wattage to be adjustable, thus allowing purchasers to purchase one light fixture that is capable of adjustment to a wide range of settings for wattage and lumen output. The one or more embodiments disclosed herein can be adapted to a variety of state of the art LED light fixtures to achieve the result of wattage and lumen output control.

Figure 1:
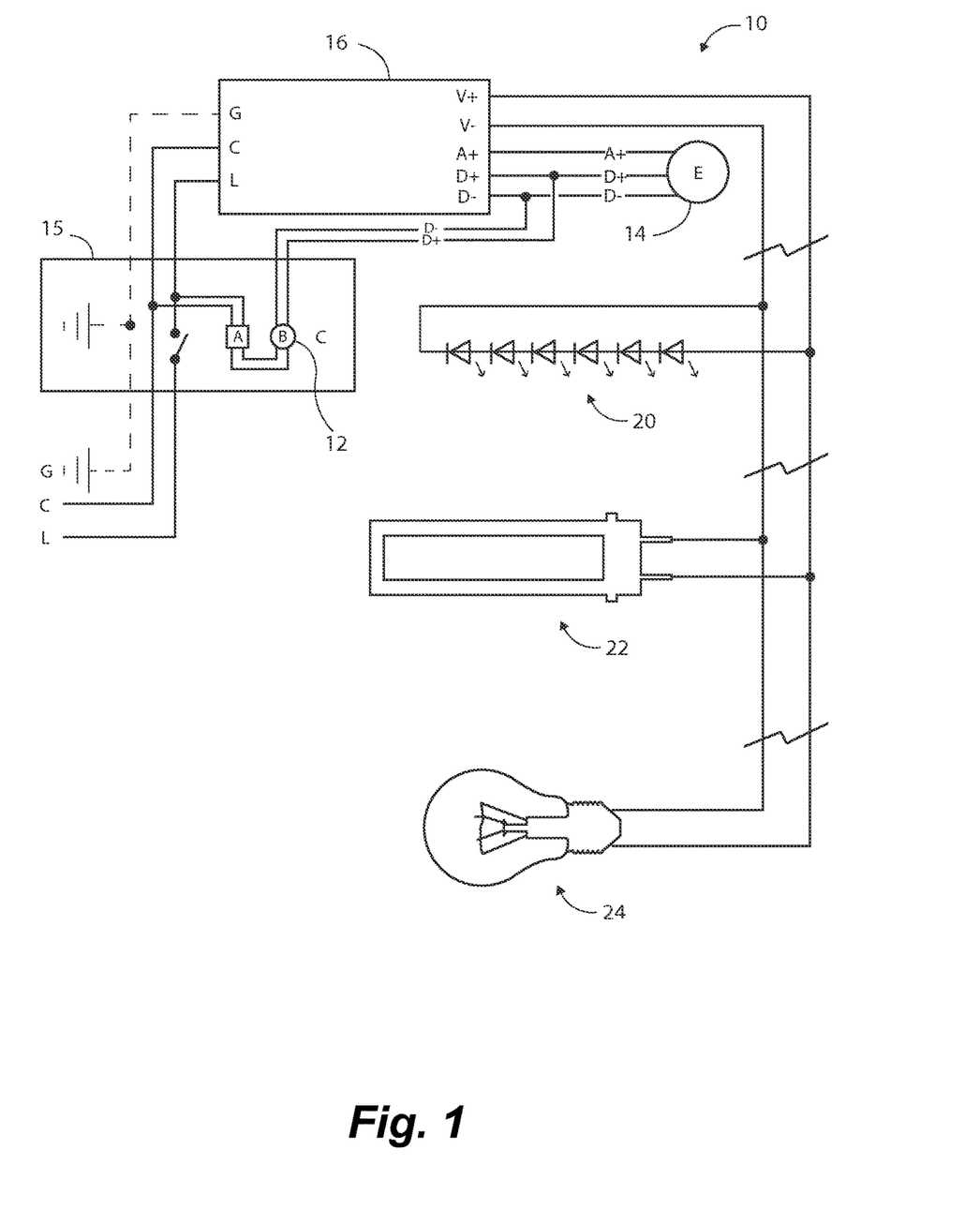
FIG. 1 illustrates a circuit according to one or more embodiments disclosed herein.

A circuit is illustrated in FIG. 1 and generally designated 10. The circuit 10 includes a dimming controller or control module 12. The dimming controller 12 may be, for example, a 0-10V dimmer. The dimming controller 12 may be a PWM. The PWM controls the pulse of power from the switch box 15 to downstream, where the switch box 15 includes the dimming controller 12. The switch box 15 also may include an AC to DC transformer. Additionally, the switch box 15 may include one or more additional features such as additional switches going to other outlets and the like. The dimming controller 12 may be selectively adjustable by turning off of a knob, selecting a desired dial level, or by smart adjustments that may be effectuated by selecting a desired dimming level on a touch-responsive control panel.

The circuit 10 may further include an adjustable resistor 14. The adjustable resistor 14 may be connected downstream of and in series connection with the dimming controller 12 and switch box 15. The adjustable resistor 14 may be a slide resistor. The adjustable resistor 14 may be a linear potentiometer.

The circuit 10 may further include a driver 16 connected downstream and in series with the adjustable resistor 14. The driver 16 is an internal mechanism that regulates power to a light source, and is advantageously used with LED light sources to vary the power supplied to the LED as the LED properties change with temperature changes.

The circuit 10 may include a light connected downstream and in series with the driver 16. A light may be any appropriately configured light, and each of an LED 20, fluorescent tube 22, and incandescent light 24 are illustrated as one embodiment thereof.

The adjustable resistor 14 may be enclosed within the light assembly when installed and therefore not accessible to outside without removal of the light. This allows the installer to adjust the wattage and lumen output at the time of installation but does not allow subsequent altering of the wattage and lumen output without some barrier to doing so, namely removal of the light assembly to access the linear resistor. Alternatively, adjustable resistor 14 may be selectively adjustable by a smart control system or have authentication/authorization permissions associated with an adjustment.

By using the adjustable resistor 14, the purchaser, installer, or owner is no longer confined to the factory pre-sets for wattage and lumen output of industry-standard outdoor LED light fixtures. In an exemplary outdoor environment embodiment, an LED roadway I street lamp can be adjusted by the purchaser, installer, or owner to an optimal wattage and lumen output for the particular installation environment of the LED light fixture. By way of example only, instead of purchasing ten different LED roadway lamps of different pre-set wattages for ten different installation points along a street being outfitted with energy efficient and long-life LED light fixtures (i.e., ten non-optimal LED roadway lamps), the purchaser can purchase a single LED roadway lamp of the present invention for all installation points and "tune" the wattage and lumen output of each light fixture to the optimal wattage and lumen output for each installation point. The one or more embodiments disclosed herein allow for near infinite wattage and lumen control adjustment up to the maximum rated output for the LED light array of the light fixture.

To provide a universal adjustable wattage limiter and light output controllable lighting fixture, the one or more embodiments disclosed herein provide for a hybrid lighting control system to prevent the dimmer 12 from overriding the wattage limiter, where the adjustable resistor 14 is the wattage limiter on the entire circuit. This system combines the use of a primary adjustable resistor 14 that is connected to the driver 16 of the light fixture. The primary adjustable resistor 14, such as a slide resistor or linear potentiometer, is used to preset or limit the maximum wattage of the fixture. Then, a secondary resistance type 12, wall, PC, remote or other dimmer (e.g. 0-1 OV or PWM) can be used in conjunction with the primary adjustable wattage limiter. The secondary dimmer 12 can also be applied to the fixture to allow the end user to adjust the light level up or down.

With this hybrid system, the primary controller (the adjustable resistor 14) will prevent the secondary dimming controller 12 from overriding the maximum wattage preset at the light fixture. This allows dimming for the customer, without surpassing the maximum wattage chosen. This allows an ESC to acquire their Return of Investment within their estimated timeframe and, even sooner if the dimmer is used often.

This hybrid lighting control system allows ESCo's the ability to purchase fixtures in advance, which saves them time, money and labor as, no matter the wattage desired by the ESCo or, the intensity of light demanded by the client, this new system can be adjusted precisely to meet both parties' expectations.

Figure 2:
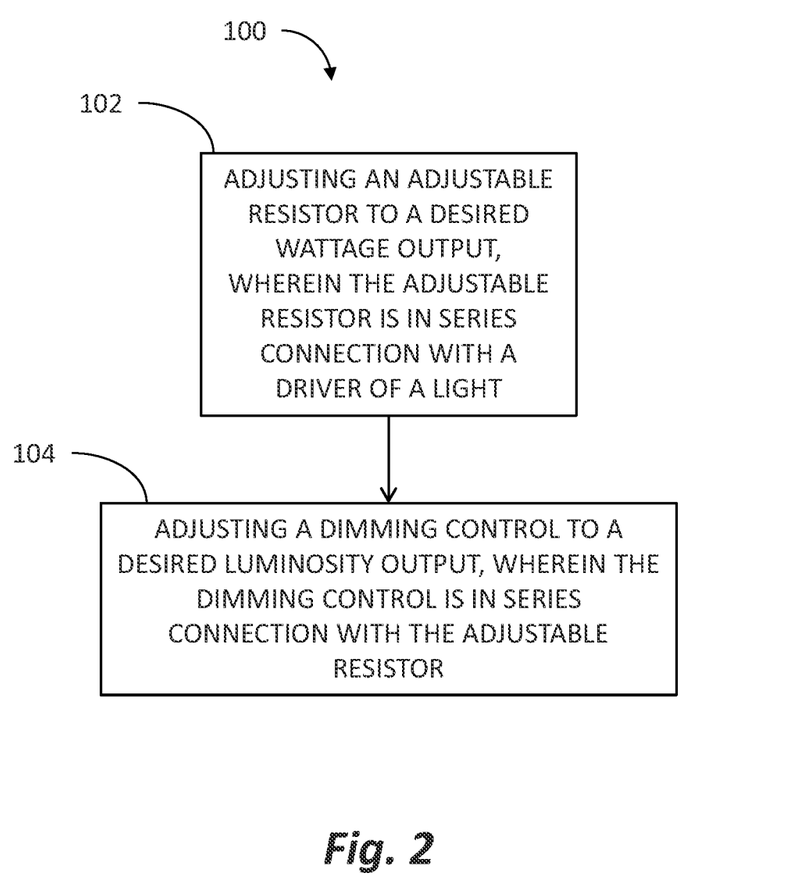
FIG. 2 illustrates one or more methods in the flowchart according to one or more embodiments disclosed herein.

One or more methods are illustrated in FIG. 2 and generally designated 100. The one or more methods 100 may include adjusting an adjustable resistor to a desired wattage output 102. The adjustable resistor is in series connection with a driver of the light. The one or more methods 100 may include adjusting a dimming control to a desired luminosity output 104. The dimming controller is in series connection with the adjustable resistor.

Figure 3:
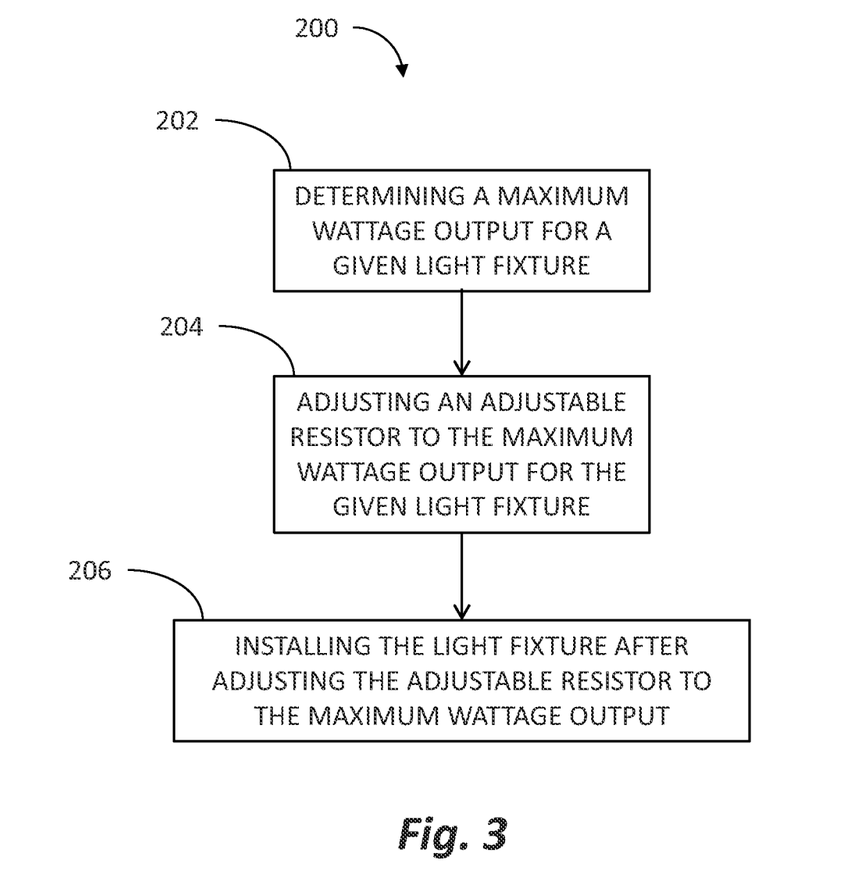
FIG. 3 illustrates one or more methods in the flowchart according to one or more embodiments disclosed herein.

One or more methods are illustrated in FIG. 3 and generally designated 200. The one or more methods 200 may include determining a maximum wattage output for a given light fixture 202. This may be requested by the customer or decided on by the installer, or may be mandated by a government or contract. The one or more methods 200 may include adjusting the adjustable resistor to the maximum wattage output for a given light fixture 204. The one or more methods 206 may further include installing the light fixture after adjusting the adjustable resistor to the maximum wattage output 206.

Figure 4:
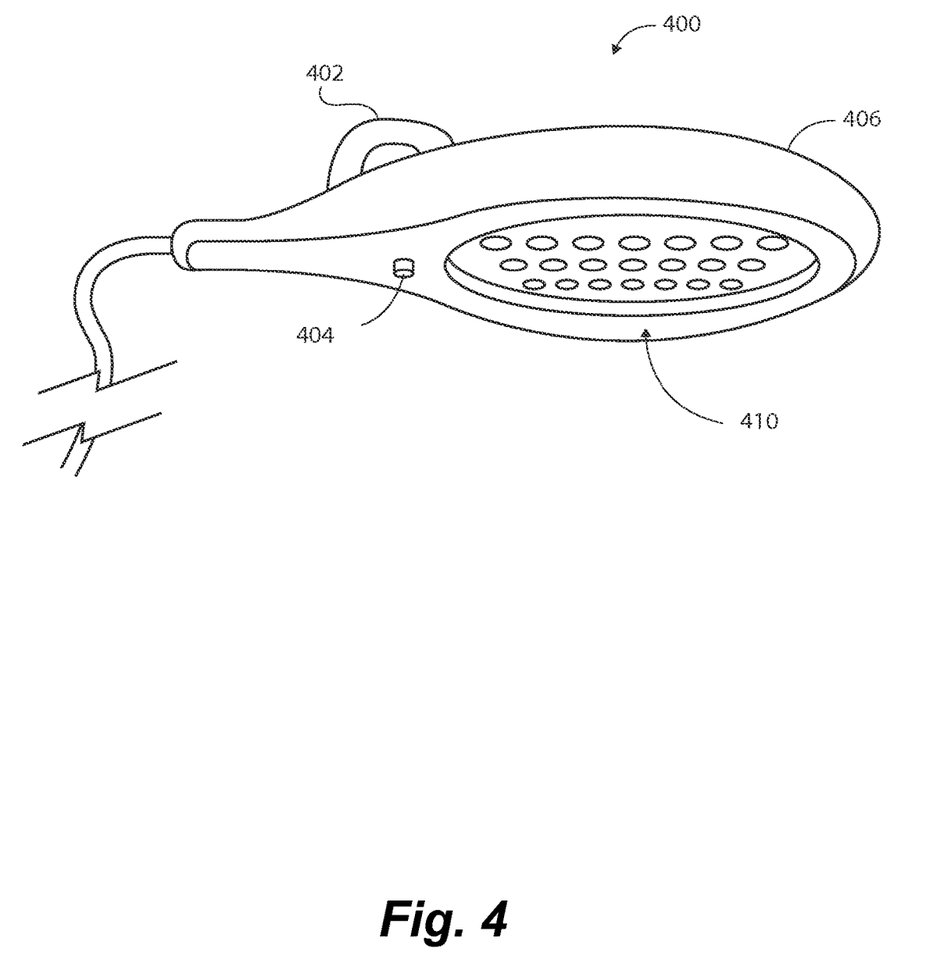
FIG. 4 shows an LED light fixture configured for illuminating a thoroughfare such as a roadway according to at least one embodiment.

FIG. 4 shows an exemplary outdoor LED light fixture 400 configured for illuminating a roadway, including a light sensor 402 for automatic control of the LED light fixture. As shown, the trim pot adjuster 404 is located on the exterior of the light fixture housing 406. Alternative embodiments may optionally have the trimpot adjuster inside the housing 406 to prevent unauthorized adjustments (tampering) of the light fixture. This embodiment and others allow a LED light fixture of any wattage to be adjustable, thus allowing purchasers to purchase one light fixture that is capable of adjustment to a wide range of settings for wattage and lumen output. The fixture can be adapted to a variety of state of the art LED light fixtures to achieve the result of wattage and lumen output control. For example, the exemplary outdoor environment embodiment is shown in FIG. 4. An LED roadway I street lamp embodiment shown in FIG. 4 includes the housing 406, at least one LED light array 410, the light sensor 402 (photo-cell or other sensor) to automatically power the light fixture on/off, a power source, lens, a driver to control the LED light array, a potentiometer ("trimpot"), and the trimpot adjuster 404. In some embodiments, the fixture includes a trim pot adjuster on the outside of the light fixture housing, as depicted in FIG. 4. In other embodiments, the present invention includes a trimpot adjuster that is not accessible on the outside of the light fixture housing. Thus, unauthorized adjustments (tampering) of the LED light fixture wattage and lumen output is inhibited.

On the output side of the driver, there is a trim pot which provides an electrical signal that leads back into the driver. In one embodiment, this electrical signal then flows through a pulse-width modulator, which controls the pulse of power coming out of the driver to the LED array. The wattage output is set at a certain level, by adjusting the trimpot adjuster, which becomes the maximum output for the LED array, until such time as the trimpot is adjusted to increase or decrease the wattage flow. The increased or decreased wattage flow to the LED array thus adjusts, either up or down, the lumen output of the LED array, and thus the LED light fixture.

The trimpot adjuster can be in any useable form, including physical and/or electromagnetic adjuster devices. For example, one embodiment includes a trimpot adjuster that is a slide switch that can be slidably adjusted to control the trimpot signals to the driver. In other embodiments, the trimpot adjuster is a knob that can be rotatably adjusted to control the trimpot signals to the driver. In still further embodiments, the trimpot adjuster is a receiver for receiving electromagnetic control signals, which could be in the form of RF, WiFi, or other useful electromagnetic form, to control the trimpot signals to the driver. Such trimpot adjuster devices will allow remote control for one or more light fixtures at a time. Electromagnetic adjuster devices may optionally be configured to require a passcode or other tamper-resistant means. In yet further embodiments, both a physical adjuster device (knob, slide, or other useful form) and an electromagnetic adjuster device (RF, WiFi, or other useful electromagnetic form) are used.

By using the trimpot adjuster, the purchaser, installer, or owner is no longer confined to the factory pre-set wattage and lumen output of industry-standard outdoor LED light fixtures. In an exemplary outdoor environment embodiment, the LED roadway I street lamp depicted in FIG. 4 can be adjusted by the purchaser, installer, or owner to an optimal wattage and lumen output for the particular installation environment of the LED light fixture. By way of example only, instead of purchasing ten different LED roadway lamps of different pre-set wattages for ten different installation points along a street being outfitted with energy efficient and long-life LED light fixtures (i.e., ten non-optimal LED roadway lamps), the purchaser can purchase a single LED roadway lamp according to embodiments herein for all installation points and "tune" the wattage and lumen output of each light fixture to the optimal wattage and lumen output for each installation point. This allows for near infinite wattage and lumen control adjustment up to the maximum rated output for the LED light array of the light fixture. The resulting lighted environment will be both cost effective for the purchaser and safer for motorists.

Other exemplary outdoor environment embodiments of the present invention include configurations for illuminating a variety of outdoor environments, including public parks, walkways and trails, parking lots, parking garages, commercial buildings, outdoor manufacturing facilities, outdoor signage, and aesthetic applications such as scenic environments or exteriors of residential and commercial/office structures. Depending on the intended application, an LED light fixture of one or more embodiments herein can take on any required shape or form. Accordingly, some embodiments have only one LED array controlled by a single LED driver equipped with a trimpot adjuster. This may be an advantageous for a simple outdoor application environment, such as some roadway lamps, parking garage lamps, and parking lot lamps. Other embodiments, however, may have more than one LED array. The LED arrays in these embodiments may be controlled by a single LED driver or one LED driver per LED array, where one or more of the LED drivers are equipped with a trimpot adjuster. For example, a more complicated outdoor application environment may require the flexibility of more than one adjustable LED array, such as complex roadway environments or building exteriors where different lumen outputs, light shape or coverage, and/or light focal direction may be desired. Also, still further embodiments are equipped with modular, replaceable LED arrays and/or LED drivers to allow for further adjustment capabilities and/or repair and service options that are currently not available in the marketplace for LED light fixtures.

Figure 5:
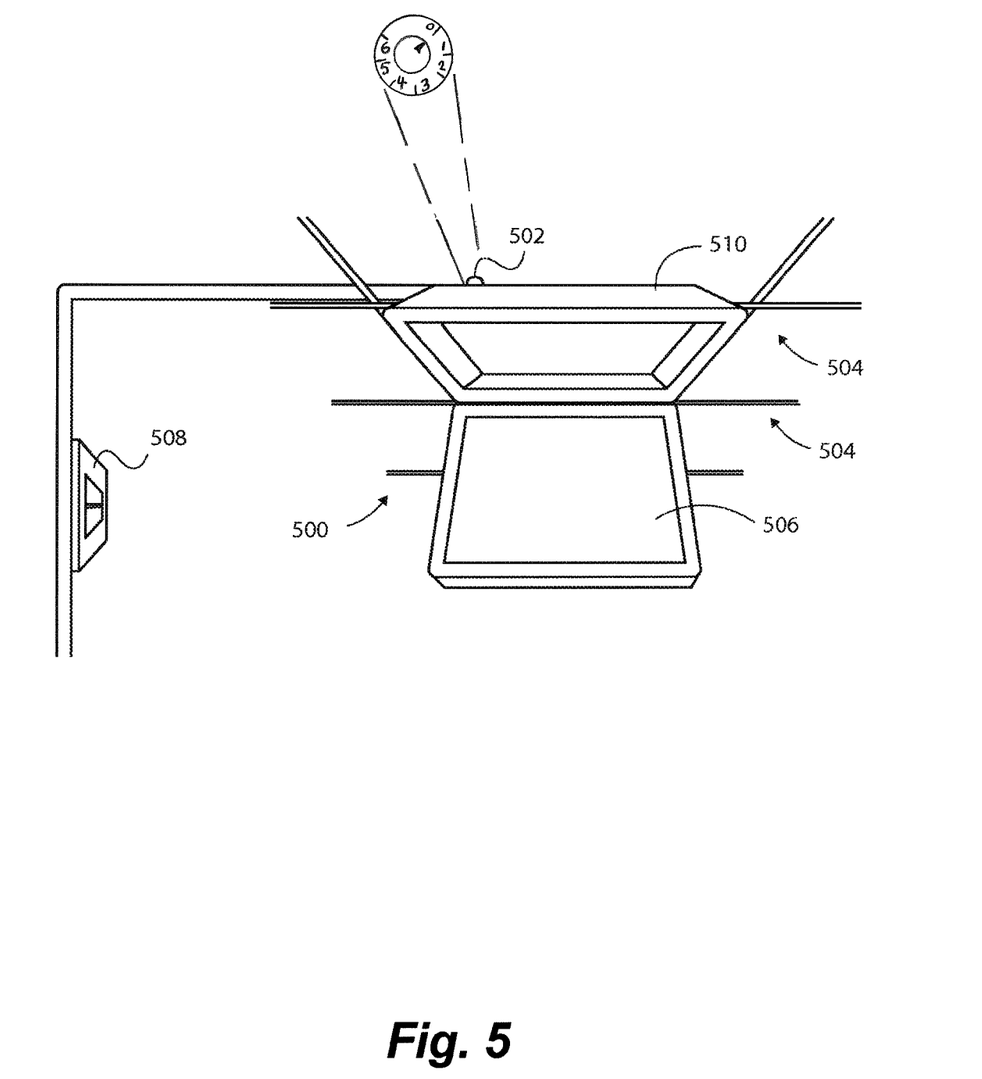
FIG. 5 shows an LED light fixture configured for installation in a drop ceiling according to at least one embodiment.

FIG. 5 shows an exemplary indoor LED light fixture 500 configured for installation in a drop ceiling. Two alternative positions of the trimpot adjuster 502 are shown. First, a trimpot adjuster could optionally be located on top of the LED light fixture hidden from view above the drop ceiling panels 504 to prevent unauthorized adjustments (tampering) of the light fixture 500. In another alternative, a trimpot adjuster could optionally be located in the interior of the LED light fixture accessible only be removing the lens cover 506 to prevent unauthorized adjustments (tampering) of the light fixture. In yet another alternative, a trimpot adjuster could optionally be located in a position on the exterior of the LED light fixture (not depicted) for unhindered access, for example, by a home owner. Also depicted is a wall mounted dimmer 508 that works independently of the trimpot and trimpot adjuster.

The indoor LED light fixture 500 embodiment for installation in a drop ceiling installation point shown in FIG. 5 includes a housing 510, at least one LED light array, a power source, drop down lens cover 506, a driver to control the LED light array, and a trimpot adjuster. In some embodiments, a trimpot adjuster is concealed from the casual observer above the drop ceiling panels on the top of the light fixture housing, as depicted in FIG. 5. In other embodiments, a trimpot adjuster is visible, but not accessible on the outside of the light fixture housing by placement in the interior of the light fixture behind the lens cover, as also depicted in FIG. 5. Thus, unauthorized adjustments (tamperings) of the LED light fixture wattage and lumen output are inhibited in both embodiments. In still further embodiments, a trimpot adjuster is visible and purposefully accessible to the purchaser, installer, or owner (e.g., a home owner or shop owner) for ready access to adjusting the LED light fixture wattage and lumen output.

Also shown in FIG. 5 is a wall mounted dimmer switch 512 as a secondary way to control some embodiments of the LED light fixture. These devices are distinct from a "light dimmer" because a dimmer employs either a resistor(s) or it "chops up" (turns the light on and off in rapid succession). These devices enable the purchaser, installer, or owner to "set" or "tune" any desired wattage output (up to the rated wattage output for that light fixture), which in turn affects the maximum lumen output of the light. Therefore, a dimmer switch could be used in conjunction with these devices to further control the LED light fixture.

The trimpot adjuster can be in any useable form, including physical and/or electromagnetic adjuster devices. For example, one embodiment includes a trimpot adjuster that is a slide switch that can be slidably adjusted to control the trimpot signals to the driver. In other embodiments, the trimpot adjuster is a knob that can be rotatably adjusted to control the trimpot signals to the driver. In still further embodiments, the trimpot adjuster is a receiver for receiving electromagnetic control signals, which could be in the form of RF, WiFi, or other useful electromagnetic form, to control the trimpot signals to the driver. Such trimpot adjuster devices will allow remote control for one or more light fixtures at a time. Electromagnetic adjuster devices may optionally be configured to require a passcode or other tamper-resistant means. In yet further embodiments, both a physical adjuster device (knob, slide, or other useful form) and an electromagnetic adjuster device (RF, WiFi, or other useful electromagnetic form) are used.

Other exemplary indoor environment embodiments include configurations for illuminating a variety of indoor environments, including indoor public spaces (libraries, offices, lobbies, terminals, etc.), residential spaces, commercial office space, commercial retail space, elevators and stairwells, indoor manufacturing and laboratory environments, indoor agricultural or horticultural spaces, museums, and any other indoor spaces where lighting control is desirable.

The shape or form of the LED light fixture for indoor environments may change given the indoor application, anticipated installation environment(s), and other criteria. Accordingly, some embodiments have only one LED array controlled by a single LED driver equipped with a trimpot adjuster. This may be an advantageous for a simple indoor application environment, such as common residential or commercial retail indoor light fixtures. For example, the exemplary indoor environment LED light fixture according to at least one embodiment is in the form of a drop ceiling lighting fixture, a common lighting fixture type in commercial office and retail space, as well as residential applications. However, embodiments can be adapted to "light bulb" forms for use in standard light bulb applications, without limit, such as the Edison screw light bulb, "tube lights", bi-pin, bayonet socket, fixed flood lamps, or other forms. Thus, a residential "light bulb" embodiment for use in a standard Edison screw base lamp may be so configured to comprise a slidably adjustable trimpot adjuster and/or a WiFi trimpot adjuster allowing a home owner to adjust the wattage and lumen output of the light fixture physically or remotely via an Internet connection. Other embodiments, however, may include more than one LED array, such as horticultural fixtures, some "tube" light fixtures, or large light fixtures. The LED arrays in these embodiments are controlled by a single LED driver or one LED driver per LED array, where one or more of the LED drivers are equipped with a trimpot adjuster. For example, a more complicated indoor application environment may require the flexibility of more than one adjustable LED array, such as indoor manufacturing spaces where different lighting conditions are required for adjacent spaces. Also, still further embodiments are equipped with replaceable LED arrays and/or LED drivers to allow for further adjustment capabilities and/or repair and service options that are currently not available in the marketplace for LED light fixtures. These embodiments would allow the consumer or end-user to replace a component of the module (such as the LED board or LED driver) and change the settings via a trimpot or similar device.

In some embodiments, overcoming disadvantages of prior LED light fixtures, a potentiometer ("trimpot") or other device is capable of making adjustments to output control signals of the LED driver, which allows the purchaser, installer, or owner of the LED light fixture to adjust the effective wattage of the LED array(s). This in turn adjusts/controls the maximum lumen output of the LED light fixture, and enables adjustability for pole height, terrain, or other environmental variability at the installation location, in the context of a LED roadway light fixture, for example.

Embodiments have been described with reference to various specific examples and techniques. However, it should be understood that many variations and modifications may be made while remaining within the spirit and scope of these descriptions. For example, the trimpot adjuster could be less dynamic than described above in the form of a knob or slidable adjuster and only provide switches or buttons that adjust the LED light fixture wattage and lumen output to a finite set of adjustments (two, three, four, etc.). Operation of such a trim pot adjuster would allow for an installer to selectively choose a predetermined wattage output based upon discrete markings that indicate the finite set of adjustments. For example, the installer could selectively adjust the trim pot adjuster to indicate that a particular number such as "2" in order to limit the maximum output of the light fixture to a wattage and lumens associated with that number. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A light fixture comprising:
    a housing configured to receive a light;
    a driver disposed within the housing, said driver including an input configured to connect to a power source and an output configured to provide power to the light; and
    an adjustable wattage limiter disposed on or in said housing, said wattage limiter being electrically connected to the driver and configured to set a maximum output power provided by the driver,
    wherein the driver and the wattage limiter are configured to provide power to the light and to vary the power, in response to a dimming input from a dimming controller, between a minimum output power and the maximum output power set by the wattage limiter.

2. The light fixture of claim 1, wherein the wattage limiter is enclosed in an interior of the housing.

3. The light fixture of claim 1, wherein the wattage limiter is an adjustable resistor.

4. The light fixture of claim 1, wherein the wattage limiter is a trimpot.

5. The light fixture of claim 1, wherein the light fixture includes an indicator to indicate the maximum output power of the light fixture set by the wattage limiter.

6. The light fixture of claim 1, wherein the light fixture includes an indicator to indicate a maximum lumen output corresponding to the maximum output power of the light fixture set by the wattage limiter.

7. The light fixture of claim 1, wherein the driver is configured to receive the dimming input directly from the wattage limiter, which is connected between the driver and the dimming controller.

8. The light fixture of claim 1, wherein the minimum output power is zero.

9. The light fixture of claim 1, wherein the dimming input is a 0-10V control input or a Pulse Width Modulation (PWM) control input.

10. A light circuit comprising:
    a light fixture including a housing configured to receive a light;
    a driver disposed within the housing, said driver including an input configured to connect to a power source and an output configured to provide power to the light;
    an adjustable wattage limiter disposed on or in said housing, said wattage limiter being electrically connected to the driver and configured to control the maximum output power level provided by the driver; and
    a dimming controller connected between the driver and the power source for providing a variable control signal to the driver to vary the output power of the driver between a minimum output power and the maximum output power set by the wattage limiter.

11. The light circuit of claim 10, wherein the wattage limiter is enclosed in an interior of the housing.

12. The light circuit of claim 10, wherein the wattage limiter is an adjustable resistor.

13. The light circuit of claim 10, wherein the wattage limiter is a trimpot.

14. The light circuit of claim 10, wherein the light fixture includes an indicator to indicate the maximum output power of the light fixture set by the wattage limiter.

15. The light circuit of claim 10, wherein the light fixture includes an indicator to indicate a maximum lumen output corresponding to the maximum output power of the light fixture set by the wattage limiter.

16. The light circuit of claim 10, wherein the wattage limiter is connected between the dimming controller and the driver, and wherein the dimming controller is configured to operate in conjunction with the wattage limiter after the maximum output power is set by the wattage limiter, to vary the power to the light between the minimum output power and the maximum output power.

17. The light circuit of claim 10, wherein the minimum output power is zero.

18. The light circuit of claim 10, wherein the dimming controller is included in a switch box that also includes an AC to DC transformer.

19. A light fixture comprising:
    a driver disposed within the fixture, said driver including an input configured to connect to a power source and an output configured to provide power to a light; and
    an adjustable wattage limiter electrically connected to the driver and configured to set a maximum output power provided by the driver,
    wherein the driver and the wattage limiter are configured to provide power to the light and to vary the power, in response to a dimming input from a dimming controller, between a minimum output power and the maximum output power set by the wattage limiter.

20. The light fixture of claim 19, wherein the light fixture includes an indicator to indicate the maximum output power of the light fixture set by the wattage limiter and a maximum lumen output corresponding to the maximum output power.

* * * * *